United States Patent [19]

Yue

[11] 4,235,674
[45] Nov. 25, 1980

[54] PRESSURIZER SYSTEM FOR ELECTRIC PENETRATION ASSEMBLIES

[75] Inventor: David D. Yue, Huntington Beach, Calif.

[73] Assignee: Bunker Ramo Corporation, Oak Brook, Ill.

[21] Appl. No.: 856,240

[22] Filed: Dec. 1, 1977

[51] Int. Cl.² ............................................. G21C 17/10
[52] U.S. Cl. ..................................... 176/87; 176/19 J
[58] Field of Search ............... 176/19 B, 19 J, 19 EC, 176/87; 174/11 R, 151

[56] References Cited

U.S. PATENT DOCUMENTS

| | | | |
|---|---|---|---|
| 3,510,762 | 5/1970 | Leslie | 174/11 R X |
| 3,533,530 | 10/1970 | Gallo et al. | 176/87 X |
| 3,781,453 | 12/1973 | Funk et al. | 174/11 R |
| 3,801,722 | 4/1974 | Korner | 174/11 R |
| 3,825,669 | 7/1974 | Korner et al. | 174/11 R |
| 3,828,118 | 8/1974 | Bushek et al. | 174/151 X |
| 3,882,263 | 5/1975 | Korner et al. | 174/11 R |
| 3,895,831 | 7/1975 | Fisher | 174/151 X |
| 3,909,500 | 9/1975 | Bereza et al. | 174/11 R |
| 4,012,282 | 3/1977 | Hutter et al. | 176/19 R X |

*Primary Examiner*—Peter A. Nelson
*Attorney, Agent, or Firm*—F. M. Arbuckle; A. Freilich

[57] ABSTRACT

A system for maintaining seal integrity under pressure and monitoring leakage within an electric penetration assembly of the type which extends through a containment wall of a nuclear reactor installation. The manifold passage in the penetration header plate is filled with a dielectric liquid and is pressurized by an apparatus which includes an accumulator containing the dielectric liquid and located inside the penetration header plate to supply the liquid thereto. The liquid in the accumulator is kept under pressure by a diaphragm separating the liquid from an inert gas which is under pressure.

4 Claims, 5 Drawing Figures

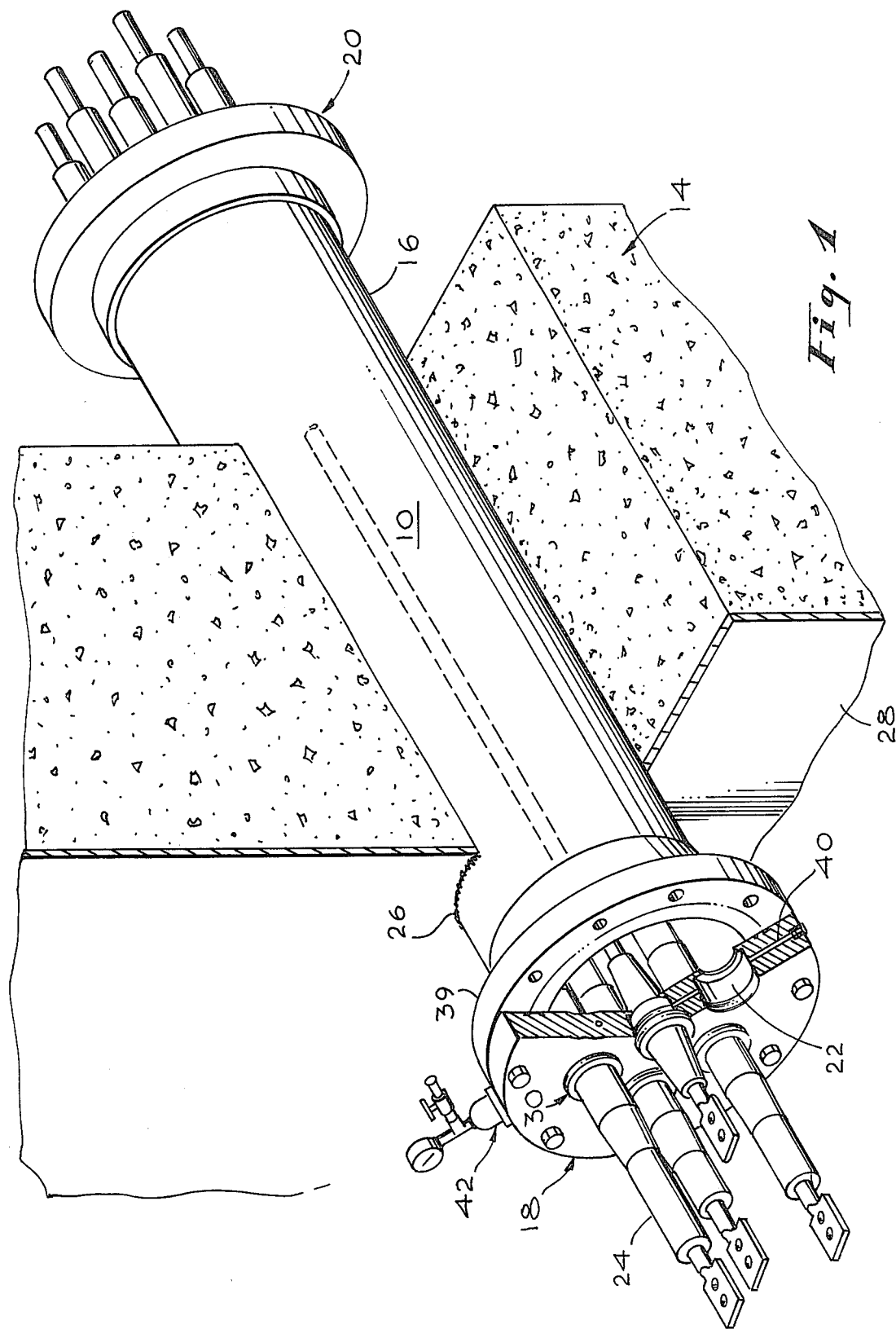

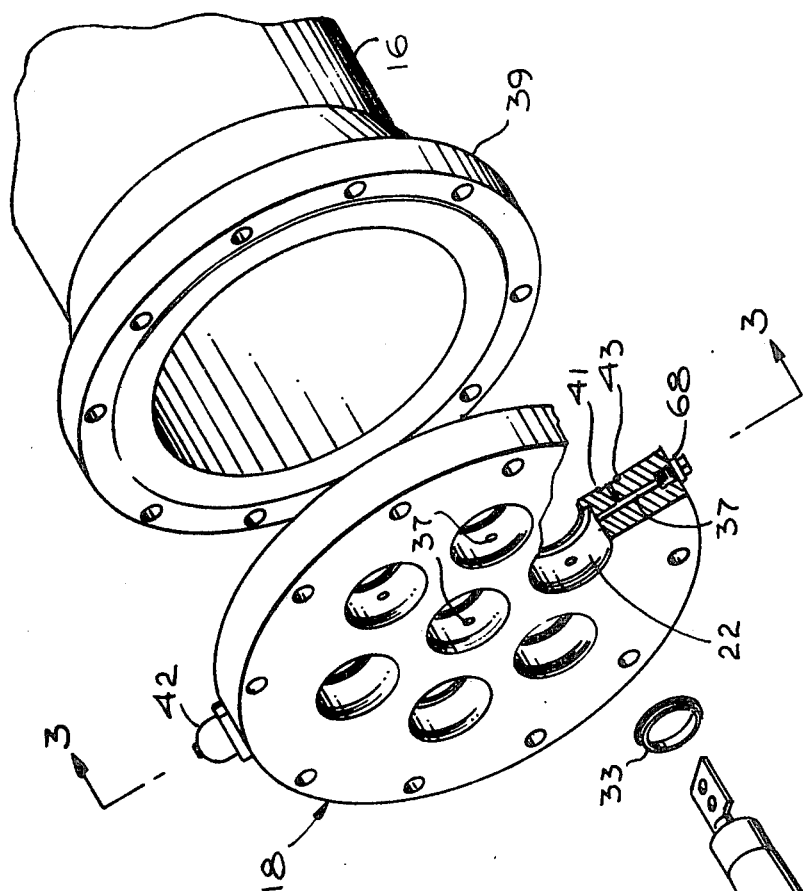
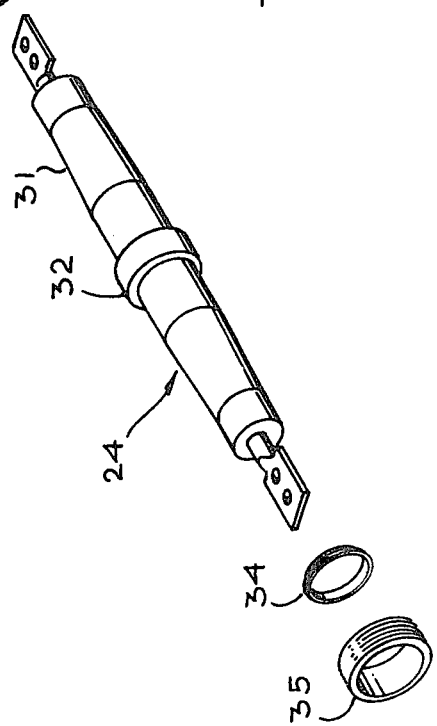
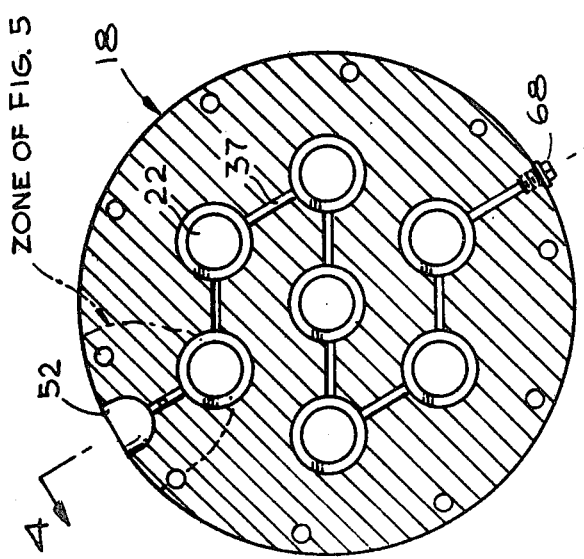

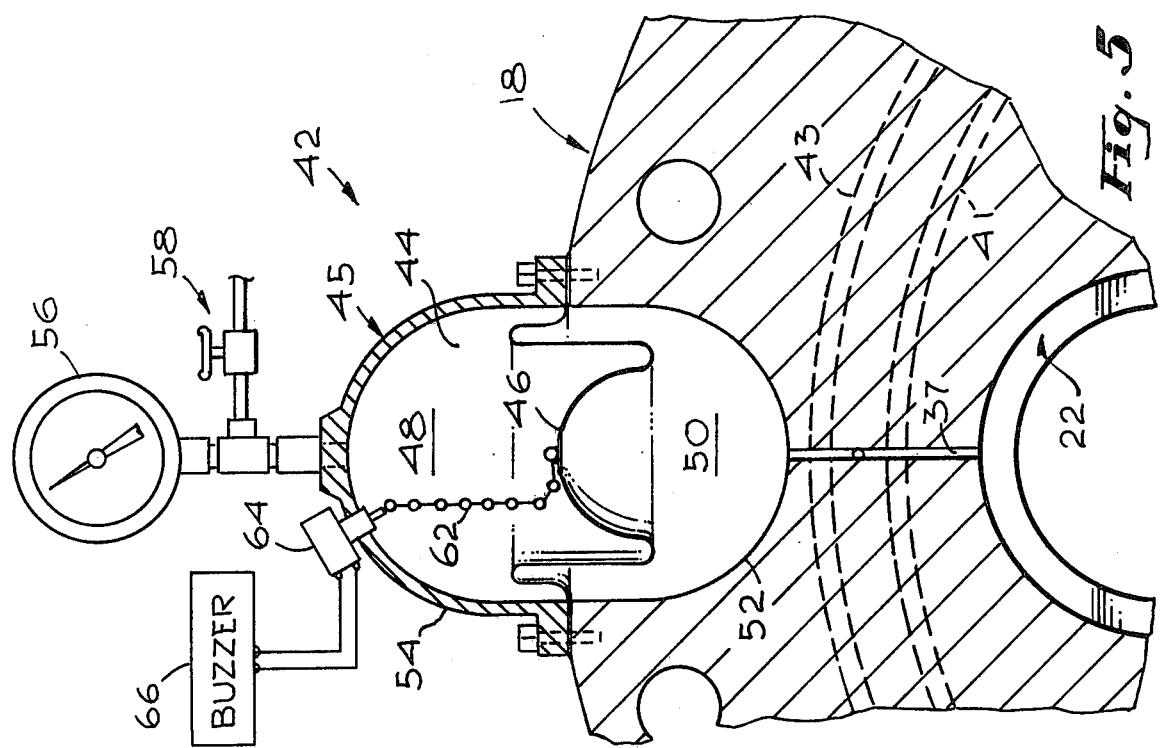
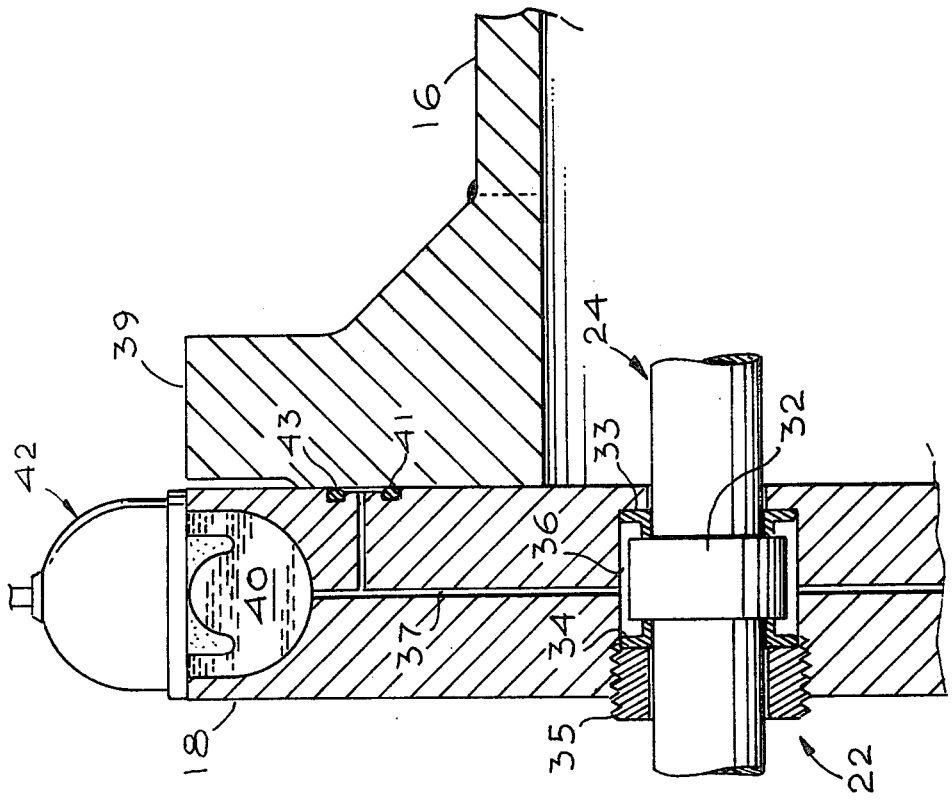

PRESSURIZER SYSTEM FOR ELECTRIC PENETRATION ASSEMBLIES

BACKGROUND OF THE INVENTION

This invention relates generally to containment electric penetration assemblies for nuclear reactor installations and the like, and more particularly to an improved pressurization system therefor.

Electric penetration assemblies are utilized to pass electric conductors through the containment wall of nuclear reactors. A typical unitized header electric penetration assembly may include a penetration nozzle which extends through the containment wall, for passing a group of electrical conductors therethrough. The penetration nozzle may have a leakage barrier in the form of a header plate at one end thereof, with threaded ports in the header plate through which the conductors pass. Although sealer fittings are provided in the ports to seal the header plate so as to avoid the leakage of gaseous radioactive material therethrough, some leakage can still occur. Accordingly, the header plate is normally filled with a pressurized gas, such as nitrogen under 80 psig, which acts on the port sealer fittings to inhibit the leakage of radioactive material through the ports. However, in typical installations there is a small but appreciable leakage of the nitrogen gas, necessitating frequent refilling of the header plate; typically a leak rate of $1 \times 10^{-2}$ standard c.c/sec of dry nitrogen is permitted in the installed configuration. The present invention is directed to a pressurization system which maintains sealing integrity of the containment electric penetration assembly under pressure in a manner which minimizes leakage to thereby greatly reduce the maintenance requirements for the penetration assemblies.

SUMMARY OF THE INVENTION

In accordance with the present invention, a pressurization system is provided which utilizes a quantity of fluid of higher viscosity than nitrogen gas, such as a dielectric liquid, to fill a leakage-barrier portion of a containment electric penetration assembly, together with means for pressurizing the fluid. In a preferred embodiment of the invention, an accumulator is provided with a diaphragm or the like, to separate one end of the accumulator chamber that contains spring means for pressing against the diaphragm, such as a pressurized gas, from another end which is filled with the dielectric liquid. The dielectric liquid is in communication with the sealer fittings in the ports of the header plate. If the dielectric liquid should slowly leak out of the header plate, any leaked liquid would be replaced by liquid from the accumulator. A switch is provided which senses movement of the diaphragm past a predetermined position to sound an alarm that warns technicians to replace the leaked dielectric liquid.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of a pressurized electric penetration assembly constructed in accordance with the present invention, shown installed on a containment wall of a nuclear reactor;

FIG. 2 is an exploded perspective view of the header plate system of the penetration assembly of FIG. 1;

FIG. 3 is a view taken on the line 3—3 of FIG. 2;

FIG. 4 is a view taken on the line 4—4 of FIG. 3; and

FIG. 5 is a view of a portion of FIG. 3.

DESCRIPTION OF THE PREFERRED EMBODIMENT

FIG. 1 illustrates an electric penetration assembly 10 useful in a nuclear reactor facility for passing electrical conductors 12 through the reactor containment wall 14 without losing containment sealing integrity under pressure. The penetrator assembly 10 includes a cylindrical penetration nozzle 16 extending through the wall 14 and having a header plate 18 providing the seal at one end. The header plate 18 has a group of ports 22 therein for receiving feedthrough modules 24. Each feedthrough module 24 extends axially through the header plate 18. Each of the feedthrough modules can be easily removed and replaced by unscrewing a module mounting assembly 30 which seals the feedthrough module to the header plate 18.

Although the module mounting assemblies 30 are intended to seal ports 22 and prevent leakage of radioactive material therethrough into or out of the penetration nozzle 16, a small amount of leakage nevertheless still typically occurs through the mounting assemblies. In order to minimize the leakage of such radioactive material past the assemblies 30, the ports 22 around the assemblies 30 are pressurized by a dielectric fluid. The pressure of the fluid around the assemblies maintains seal integrity and prevents the leakage of radioactive material through the ports 22 from the high level radiation side of the wall 14 into the environment.

As indicated in FIGS. 2 and 4, each feedthrough 24 includes a barrel 31 of dielectric material which surrounds a central conductor and has a sealing flange 32 which is designed to lie in one of the parts 22. The mounting assembly 30 includes a pair of seals 33, 34 lying at opposite ends of the sealing flange 32 and a retainer 35 that screws into threads in the port 22 to hold the seals tightly in place. The space 36 between the seals 33, 34 contains the pressurized fluid 40.

In order to carry the pressurized fluid 40 to all ports 22, a network of arteries 37 is provided which is formed in the header plate 18. The arteries 37 lead to the area 36 of each port which lies between the seals 33, 34. Thus, if any seal is imperfect and fluid 40 leaks out of the seal, the leaked fluid can be replaced by fluid flowing in through an artery 37 leading to that port. As long as the fluid is maintained under pressure, radioactive material cannot pass into the region 36 between the seals 33, 34.

It may be noted that the penetration nozzle 16 has a flange 39 at one end, against which the header plate 18 bears. A pair of elastomeric aperture seals 41, 43 extend around the periphery of the header plate 18 to seal plate 18 to flange 39. As shown in FIG. 4, the network of fluid arteries 37 includes a portion which leads to the region between the seals 41, 43, to prevent the passage of radioactive material through the penetration nozzle into the atmosphere.

In accordance with the present invention, the fluid 40 within the arteries 37 of the header plate 18 is a viscous fluid comprising a dielectric liquid, and the dielectric liquid is maintained under pressure by a pressurizing system 42. As shown in FIG. 5, the pressurizing system 42 includes an accumulator 45 having walls forming a chamber 44 containing a moveable separator such as a diaphragm 46 separating a pressurized gas compartment 48 from a dielectric liquid compartment 50. The dielectric liquid compartment 50 is connected to the artery network 37 to pressurize the dielectric liquid 40 and to supply liquid to compensate for any that has leaked out.

The pressurizing system 42 includes a recess 52 in the header plate 18 and a cover 54 which covers the recess. A pressure gauge 56 and a refill coupling 58 are connected to the gas compartment 48 to enable monitoring of gas pressure and refill of gas. A Chain 62 connects the diaphragm to a sensor 64. When most of the dielectric liquid 40 has flowed out of the accumulator. The chain touches the metal part of the recess 52 forming a short circuit to activate the sensor 64. The sensor then conducts current to a buzzer 66 or other alarm, to alert a technician that there is a low level of liquid in the accumulator.

A dielectric liquid 40, such as dimethylsiloxane, has a viscosity much larger than gases such as nitrogen which have been used heretofore in penetrators. As a result, seal assemblies such as that shown at 30, which result in low leakage rates for nitrogen, allow substantially no leakage when used with a dielectric liquid. Accordingly, there will normally be no detectable leakage of dielectric liquid out of the penetration assembly even over extended periods of time. This reduces maintenance requirements for the penetrator installation.

Thus, the invention provides a containment electric penetration system which can be pressurized in a manner that can substantially avoid leakage of a pressurizing fluid, to thereby reduce the required maintenance for such installations. This is accomplished by utilizing a high viscosity dielectric liquid under pressure which communicates with the ports 22 around the feedthrough 24 between the removable seals 33, 34. It should now be recognized that an embodiment of the invention monitors leakage past the mounting assemblies 30 around the feedthroughs 24. Additional leakage can, however, occur through the feedthroughs 24, i.e. along the interface between the feedthrough barrel 31 and the central conductor around which it is formed. This leakage can also be monitored by an embodiment of the invention by providing a communication path (not shown) from that interface through the flange 32 to the dielectric fluid 40 around the flange.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A nuclear reactor penetration installation comprising:
   a penetration nozzle having a header plate with ports for passing electrical conductors therethrough;
   sealing means supported adjacent to said ports;
   means for holding a quantity of dielectric liquid in contact with said sealing means;
   an accumulator including a quantity of dielectric liquid therein;
   means for communicating said dielectric liquid in said accumulator with said dielectric liquid in said holding means; and
   means in said accumulator for maintaining pressure to the dielectric liquid therein.

2. A nuclear reactor penetration installation comprising:
   a penetration nozzle;
   a header plate mounted at an end of said nozzle, said header plate having a plurality of ports extending therethrough and having a plurality of channels interconnecting said ports;
   a plurality of electrical feedthroughs extending through ports in said header plate;
   a pair of seals sealing each of said feedthroughs to the walls of a corresponding port at locations on opposite sides of a channel end which communicates with the port;
   an accumulator having walls forming a chamber and having a diaphragm extending across said chamber to divide it into first and second compartments, said first compartment coupled to one of said ports;
   a quantity of gas under pressure disposed in said second compartment; and
   a quantity of dielectric liquid disposed in said first compartment, in said channels, and in the regions of each of said ports which lie between the pair of seals in the port.

3. The system of claim 2 including means responsive to said diaphragm moving to a predetermined position, for initiating an alarm.

4. A nuclear reactor penetration installation comprising:
   a penetration nozzle;
   a header plate mounted at an end of said nozzle, said header plate having a plurality of ports extending therethrough and having a plurality of channels interconnecting said ports;
   a plurality of electrical feedthroughs extending through ports in said header plate, each feedthrough portion which lies in a port being smaller than the port so that the feedthrough is radially spaced from the walls of the port where said channels intersect it;
   a pair of seals sealing each of said feedthroughs to the walls of a corresponding port at locations on opposite sides of a channel end which communicates with the port;
   an accumulator having walls forming a compartment, said compartment coupled to one of said ports;
   a quantity of dielectric liquid disposed in said compartment, in said channels, and in the regions of each of said ports which lie between the pair of seals in the port; and
   means for pressurizing said liquid.

* * * * *